US011845147B2

(12) United States Patent
Lim et al.

(10) Patent No.: US 11,845,147 B2
(45) Date of Patent: Dec. 19, 2023

(54) HETEROGENEOUS NUT WELDING AUTOMATION SYSTEM FOR METAL-PROCESSED PRODUCTS FOR VEHICLE

(71) Applicant: SAMSUNG TECH CO., LTD., Gyeongsan-si (KR)

(72) Inventors: Yong Taek Lim, Daegu (KR); Tae Gil Lee, Daegu (KR)

(73) Assignee: SAMSUNG TECH CO., LTD., Gyeongsan-si (KR)

( * ) Notice: Subject to any disclaimer, the term of this patent is extended or adjusted under 35 U.S.C. 154(b) by 407 days.

(21) Appl. No.: 17/099,798

(22) Filed: Nov. 17, 2020

(65) Prior Publication Data

US 2022/0111473 A1    Apr. 14, 2022

(30) Foreign Application Priority Data

Oct. 12, 2020  (KR) .......................... 10-2020-0131031

(51) Int. Cl.
*B23K 37/04*    (2006.01)
*B23K 11/25*    (2006.01)

(52) U.S. Cl.
CPC .......... *B23K 37/0443* (2013.01); *B23K 11/25* (2013.01)

(58) Field of Classification Search
CPC .. B23K 37/0443; B23K 11/25; B23K 37/047; B23K 11/0046; B23K 31/02; B23K 31/125; B23P 19/06; B65G 35/00
See application file for complete search history.

(56) References Cited

U.S. PATENT DOCUMENTS

| | | | | |
|---|---|---|---|---|
| 5,471,026 A * | 11/1995 | Ilies | ..................... | B23K 11/065 219/79 |
| 10,471,549 B2 * | 11/2019 | Koscielski | ............ | B23K 11/115 |
| 2007/0145028 A1 * | 6/2007 | Artelsmair | ........... | B23K 9/1675 219/137.71 |
| 2012/0144785 A1 * | 6/2012 | Vaccari | ................. | B65B 31/028 198/346.3 |
| 2012/0152911 A1 * | 6/2012 | Diez | .................. | B23K 37/0211 219/117.1 |
| 2013/0187902 A1 * | 7/2013 | Randall | ................. | G06T 11/001 345/582 |
| 2015/0101910 A1 * | 4/2015 | Cribiu | .................... | B65G 21/10 198/592 |
| 2017/0095901 A1 * | 4/2017 | Nakamura | ............ | B24B 49/105 |
| 2019/0105729 A1 * | 4/2019 | Hatada | ................. | B23K 11/314 |
| 2020/0254617 A1 * | 8/2020 | Aldridge | ............... | B25J 9/1612 |

FOREIGN PATENT DOCUMENTS

| | | | |
|---|---|---|---|
| KR | 101066800 B1 * | 9/2011 | |
| KR | 20120016746 A * | 2/2012 | |
| KR | 101290903 B1 * | 7/2013 | |

(Continued)

*Primary Examiner* — Helena Kosanovic
*Assistant Examiner* — Thao Uyen Tran-Le
(74) *Attorney, Agent, or Firm* — Nicholas Park

(57) ABSTRACT

Disclosed is a nut welding automation system configured to automatically weld different types of nuts to holes formed in a metal-processed product using a robot. The system may reduce an error rate with respect to products by preventing omission of a nut or welding of a wrong type nut so that reliability in administration of the welding process may be secured and overall productivity may be improved.

6 Claims, 9 Drawing Sheets

(56) References Cited

FOREIGN PATENT DOCUMENTS

| KR | 20160049783 A | * | 5/2016 |
| KR | 1020180122981 | | 11/2018 |
| KR | 1020190081672 | | 7/2019 |
| KR | 102013447 B1 | * | 8/2019 |
| KR | 1020523040000 | | 1/2020 |

* cited by examiner

[Fig 1]
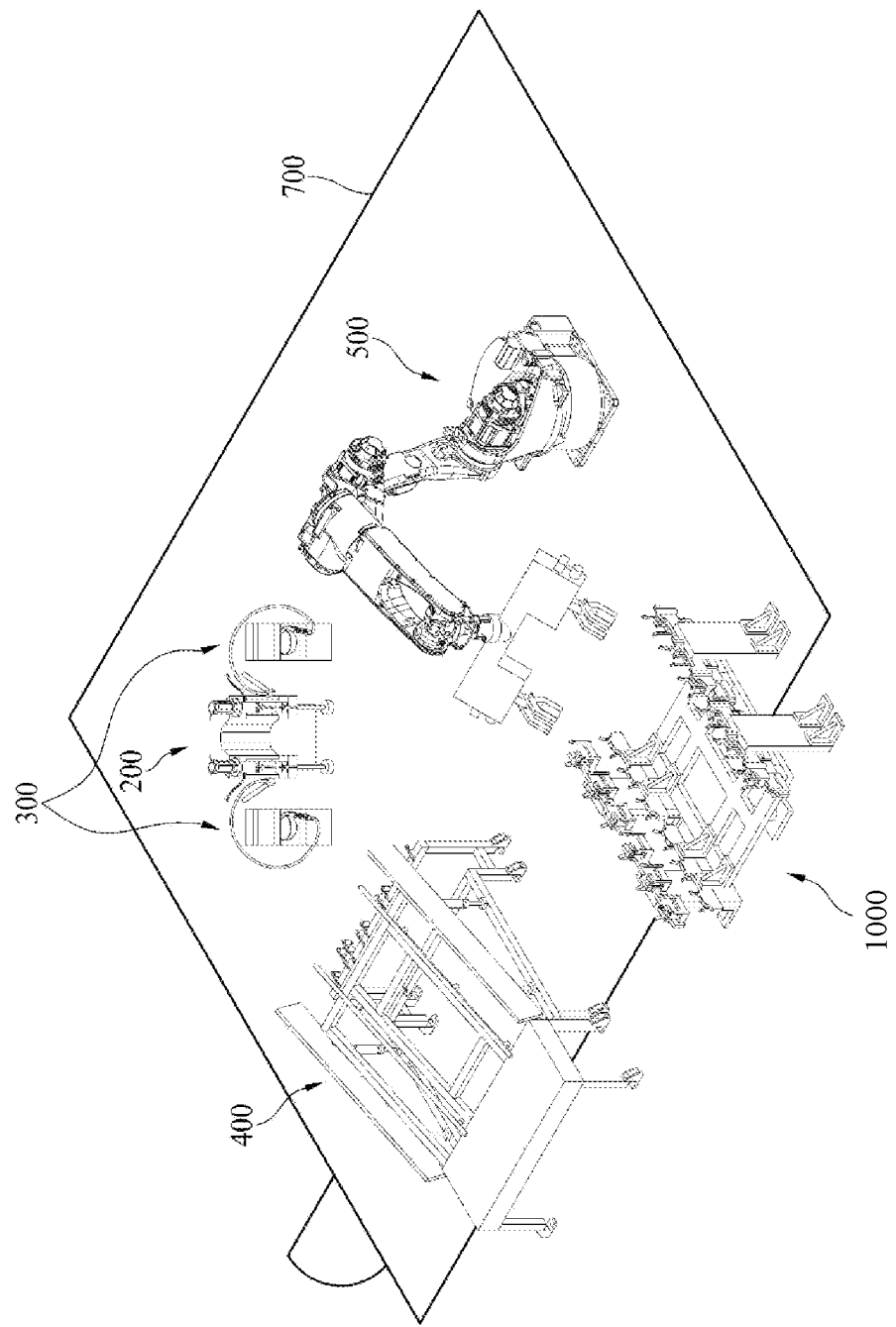

[Fig2]
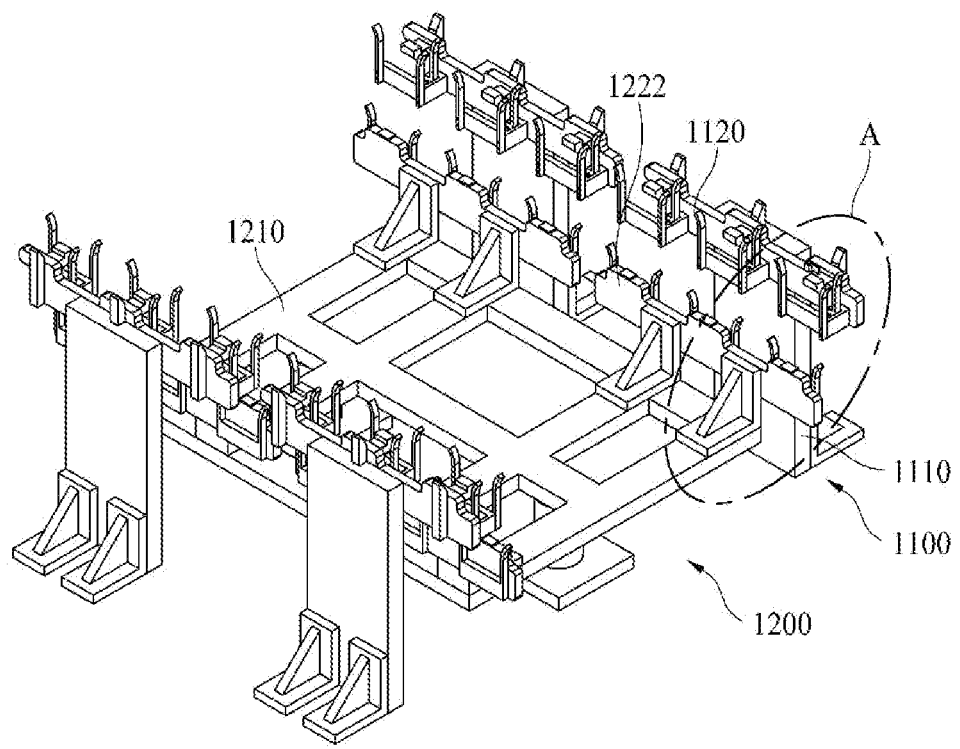

[Fig 3]
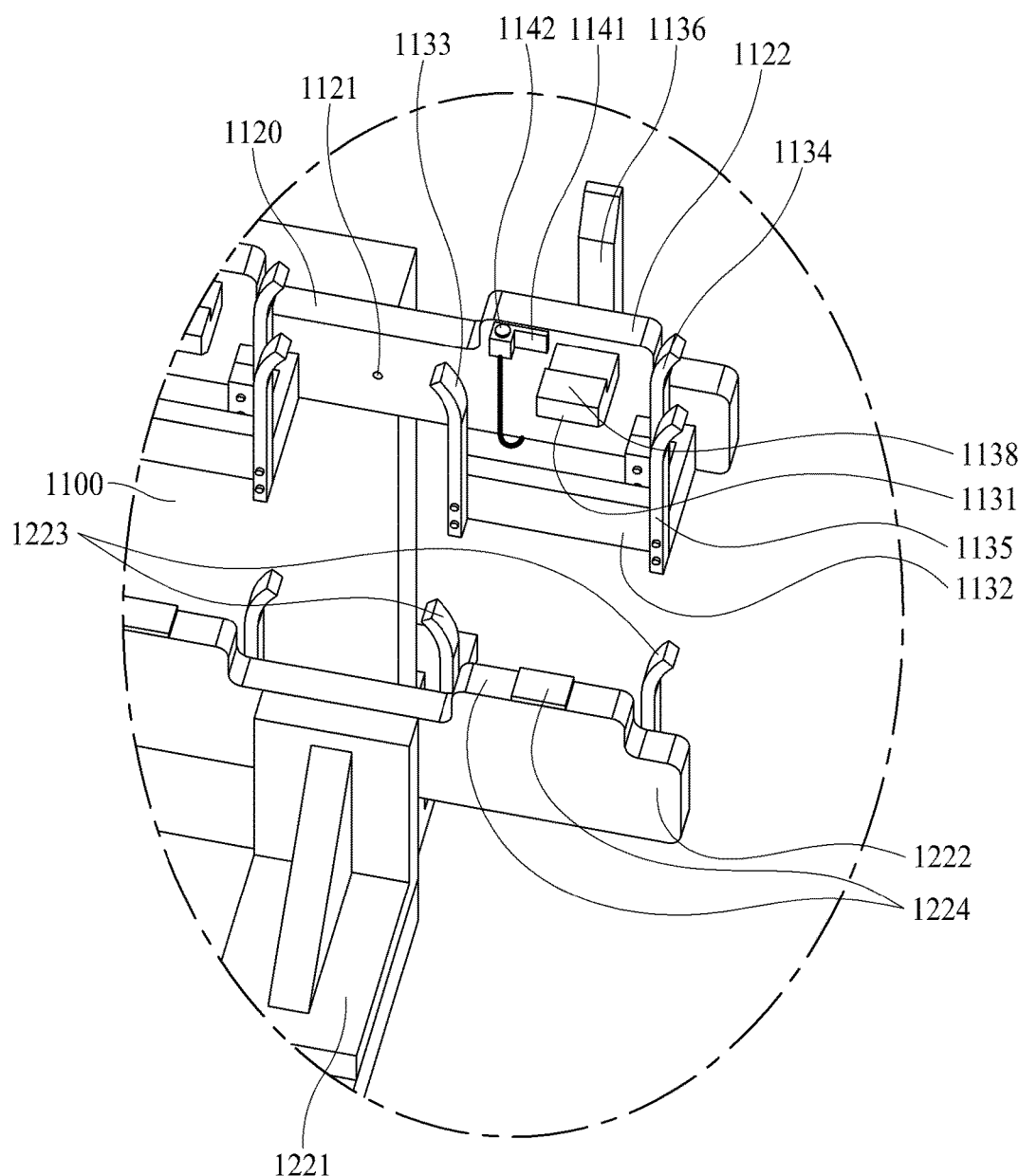
1100 : 1100 ~ 1142
1220 : 1221 ~ 1224
1130 : 1131 ~ 1138

[Fig 4]
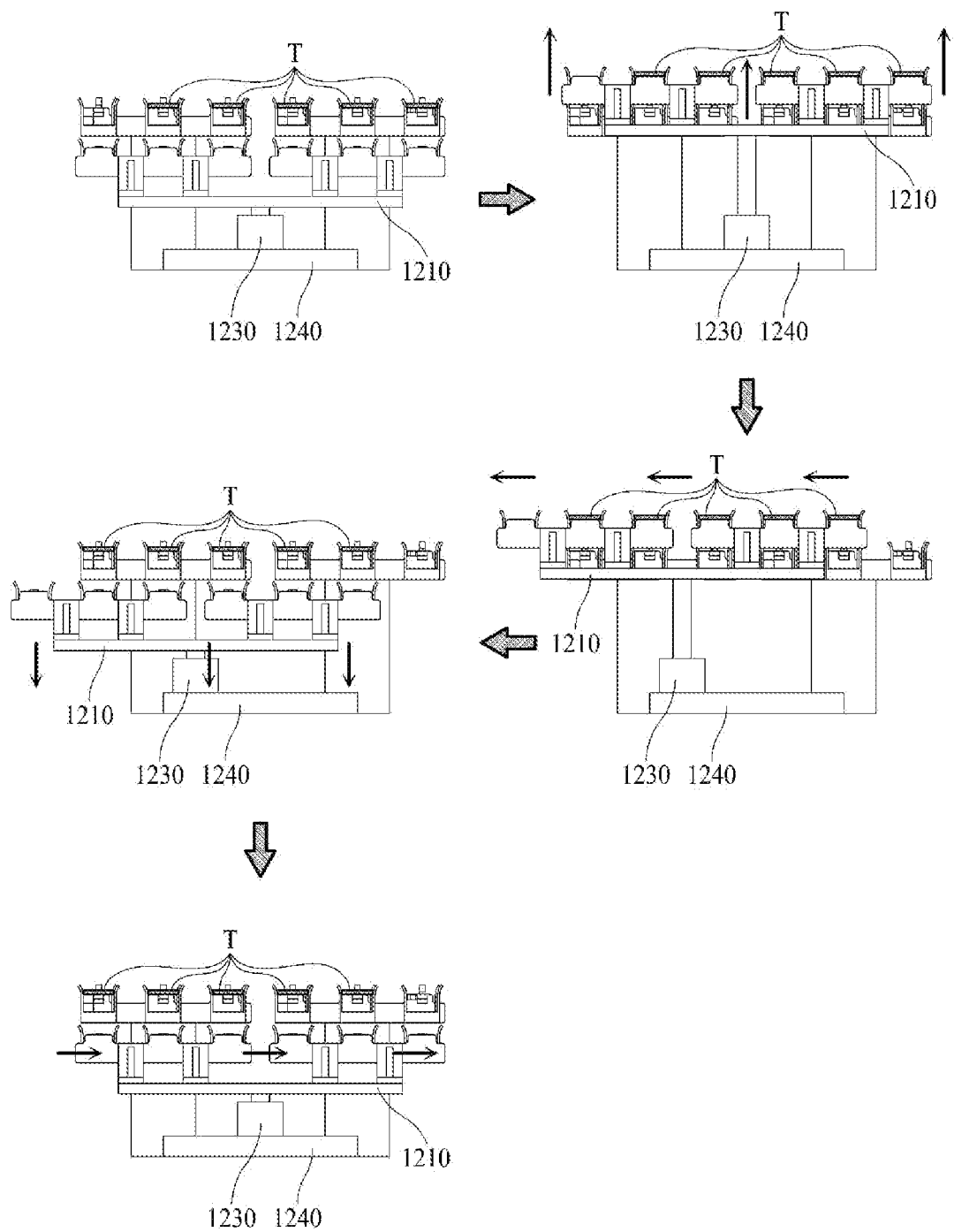

[Fig 5]
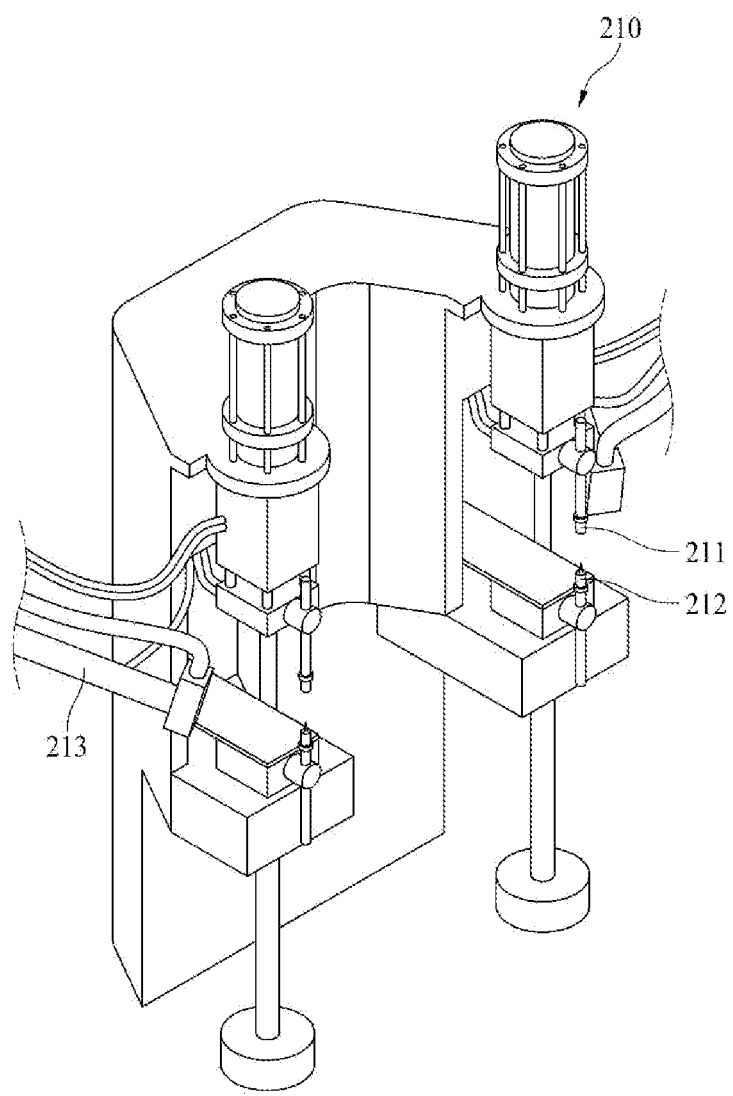

[Fig 6]
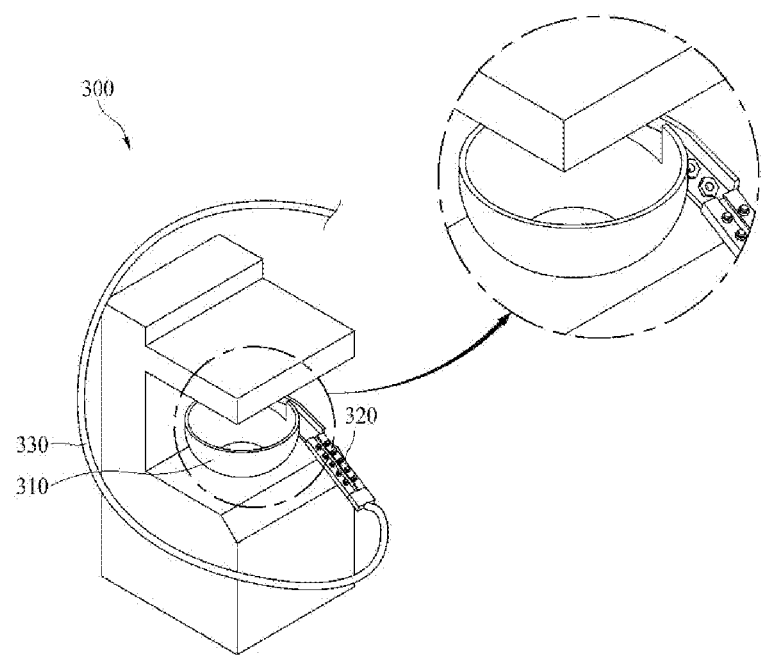

[Fig 7]
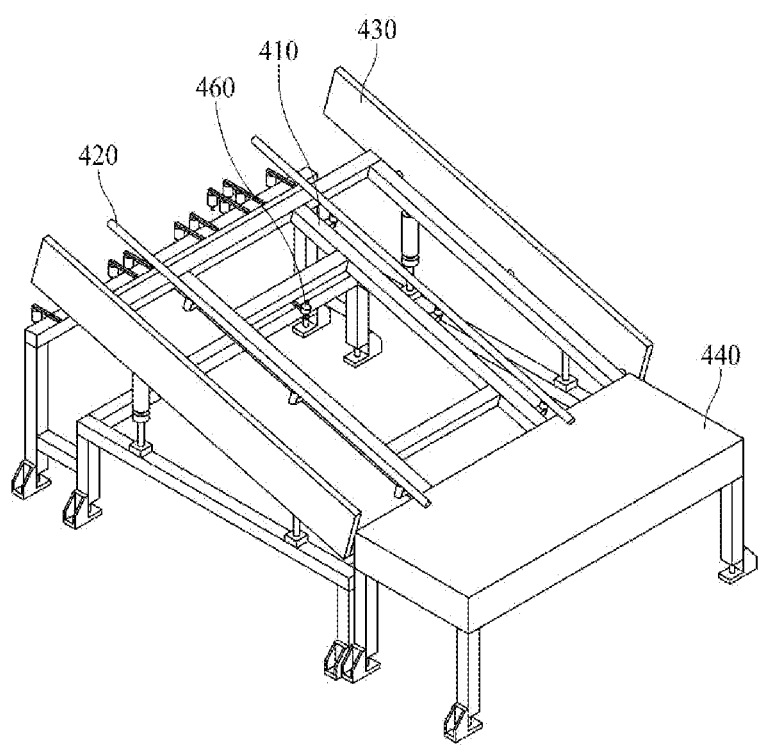

[Fig 8]
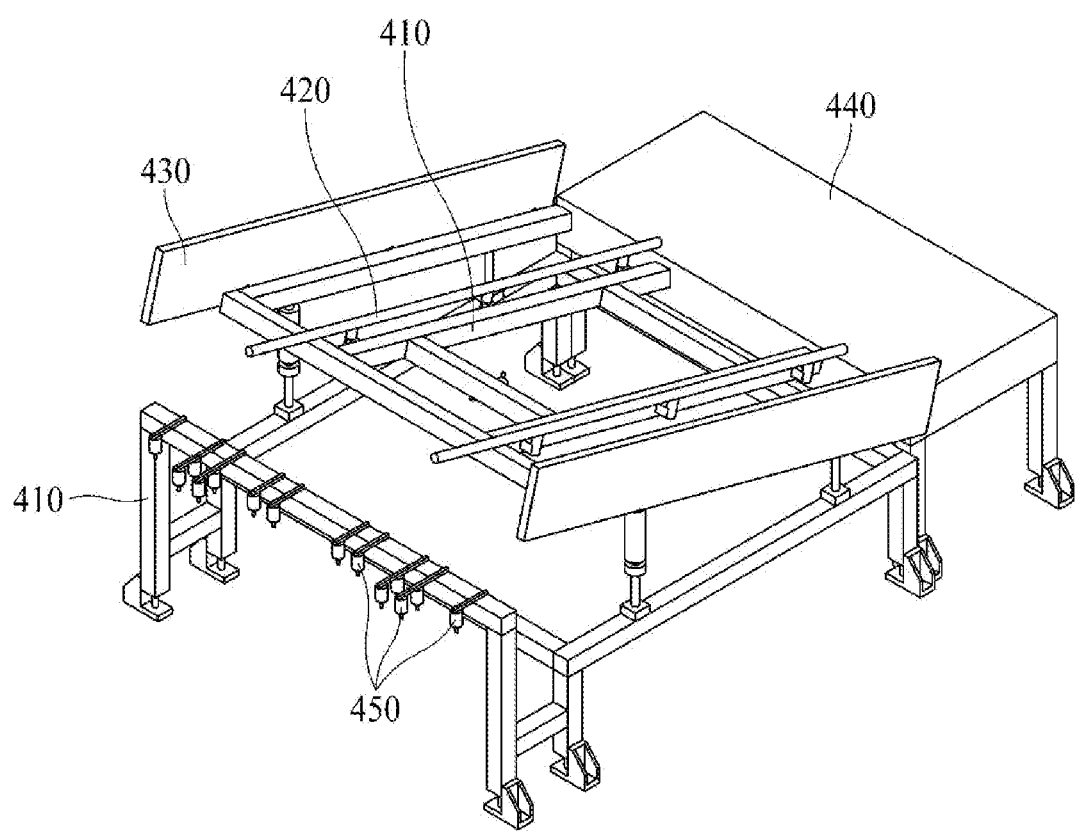

[Fig 9]
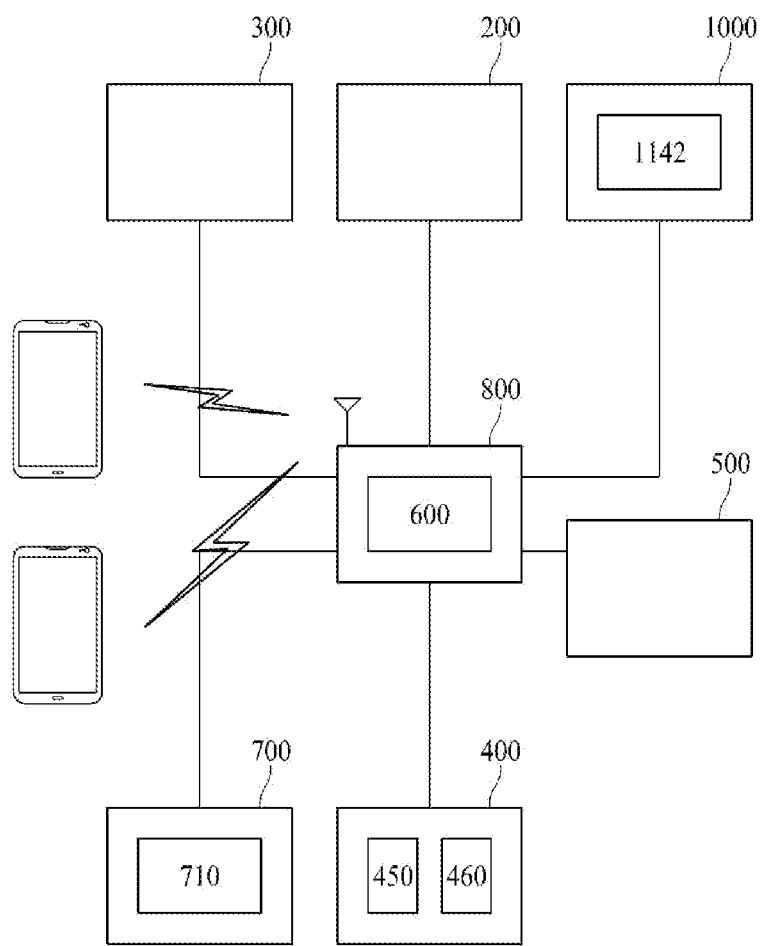

HETEROGENEOUS NUT WELDING AUTOMATION SYSTEM FOR METAL-PROCESSED PRODUCTS FOR VEHICLE

CROSS-REFERENCE TO RELATED APPLICATION

This application claims priority to and the benefit of Korean Patent Application No. 10-2020-0131031, filed on Oct. 12, 2020, the disclosure of which is incorporated herein by reference in its entirety.

BACKGROUND

1. Field of the Invention

The present invention relates to a nut welding automation system configured to automatically weld different types of nuts to holes formed in a metal-processed product using a robot.

2. Discussion of Related Art

Generally, a vehicle includes many components which are assembled through an automation process. Components for a vehicle may be produced as final products and components through a pressing process, a welding process, and the like. A metal-processed product for a vehicle which is an object to be welded has a complicated shape with a sharp edge and has a certain weight due to a size thereof or the like. Also, a plurality of holes are formed in the metal-processed product so as to weld different types of nuts, bolts, and the like thereto.

A conventional welding process is a manual type process in which a metal-processed product is transferred and types and numbers of nuts are checked by a worker. However, the manual type process includes possibilities of an accident caused by negligence, a failure caused by a mistake of a worker, a decrease in productivity, and the like. Also, although it is necessary in a welding process to provide welding parts with the same torque performance and uniform welding quality, it depends on skill of a worker or the like.

Accordingly, in addition to technical needs for facilities capable of reducing a process time and cost in a welding process and of improving productivity and competitiveness of products, development of an automation system therefore is urgently needed.

RELATED ART DOCUMENTS

Patent Documents

Patent Document 1: Korean Patent Registration No. 10-2052304 (registered on Nov. 28, 2019)
Patent Document 2: Korean Patent Publication No. 10-2018-0122981 (published on Nov. 14, 2018)
Patent Document 3: Korean Patent Registration No. 10-2015886 (registered on Aug. 23, 2019)

SUMMARY OF THE INVENTION

The present invention is directed to providing a heterogeneous nut welding automation system for a metal-processed product by introducing a variety of elements and techniques optimized for automation into a process of welding different nuts several times to a metal-processed product for a vehicle which has a complicated shape.

The present invention is also directed to securing reliability in quality by uniformly providing a current and pressure which are significant factors of welding for each nut in a welding process. The present invention is also directed to preventing omission of a nut or welding of a wrong type of nut. Accordingly, an error rate with respect to products may be reduced.

The present invention is also directed to securing reliability in administration on the welding process and improving overall productivity. The present invention is also directed to improving benefit in management by reducing product costs.

The present invention is also directed to reducing occurrence of negligent accidents caused by a mistake of a worker or the like by minimizing input of workers. The present invention is directed to conveniently maintaining and managing respective components of the system by facilitating a coupling relationship between the components.

According to an aspect of the present invention, there is provided a heterogeneous nut welding automation system for a metal-processed product. The system includes an automatic shuttle machine including a fixing jig part on which a plurality of metal-processed products are arranged in a row to be spaced apart such that the metal-processed product is loaded on one end and the metal-processed product is unloaded on the other end and including a transfer jig part configured to intermittently transfer the metal-processed products arranged on the fixing jig part from one side to the other side when unloading is detected, a welding machine configured to weld heterogeneous nuts to a plurality of holes formed in the metal-processed product, a nut supply unit configured to supply the heterogeneous nuts to the welding machine, a withdrawal unit configured to check whether the number of nuts welded to the metal-processed product is normal and then move the metal-processed product to a withdrawal pad, a robot configured to grip and move the metal-processed product from the automatic shuttle machine to the welding machine, translocate the metal-processed-product to allow the nuts to be welded thereto, and drop the metal-processed product to the withdrawal unit, and a control unit configured to process electrical signals transmitted from the automatic shuttle machine, the welding machine, the nut supply unit, the withdrawal unit, and the robot and generate a control signal.

The welding machine may include two or more welding units disposed to be spaced apart. Here, the welding units may be controlled to provide mutually different currents and pressures, and one nut supply unit configured to supply only one type of nuts may be connected to each of the welding units.

The fixing jig part may include a fixing frame portion in which a plurality of fastening holes are repetitively formed in the same pattern and which includes a first perpendicular plate on which a seat surface protruding at a certain distance to allow a part of the metal-processed product to be mounted thereon is formed and may include a jig portion coupled to the fixing frame portion at a certain interval through the fastening holes so as to hold the metal-processed product.

A first jig portion of the jig portion which is disposed on one end and on which the metal-processed product is initially loaded may include a bracket frame installed on one side surface of the first perpendicular plate and a current-applying sensing portion inserted into the bracket frame and formed to have the same height as the seat surface so as to detect whether currents are applied.

The jig portion may include an auxiliary frame coupled to a side surface of the first perpendicular plate and on which an auxiliary seat surface configured to assist mounting of the metal-processed product is formed, a spacing frame configured to have a stapler shape and have one end coupled to the side surface of the first perpendicular plate, a front surface holding frame coupled to the other end of the spacing frame and configured to hold a front surface of the metal-processed product, and a rear surface holding frame coupled to the first perpendicular plate through the same fastening hole as the spacing frame in a side surface of one end of the spacing frame and configured to hold a rear surface of the metal-processed product.

The transfer jig part may include a transfer frame portion, a transfer jig unit coupled to the transfer frame portion and disposed inside the fixing jig part so as to hold the metal-processed product being transferred, a lift portion configured to provide the transfer frame portion with upward and downward vertical movement, and a horizontal movement portion configured to provide the transfer frame portion with front-rear horizontal movement.

The transfer jig unit may include a fixing bracket portion coupled to the transfer frame portion, a second perpendicular plate coupled to the fixing bracket portion and on which a transfer seat surface protruding at a certain distance to allow a part of the metal-processed product being transferred to be mounted thereon is formed, and a transfer jig portion coupled to the second perpendicular plate at a certain interval and configured to temporarily hold the metal-processed product being transferred.

In the transfer jig part, when unloading is sensed, 1) the transfer jig unit may be moved upward by the lift portion and may lift the metal-processed product disposed on the fixing jig part, 2) when the transfer jig unit is moved by the horizontal movement portion a preset distance from one side to the other side, and 3) the transfer jig unit may be moved downward by the lift portion and the metal-processed product held by the transfer jig unit may be disposed on the next fixing jig part The withdrawal unit may include a body frame portion formed by coupling a plurality of pieces of angle iron disposed in vertical, horizontal, and tilted directions, a slope rod disposed above the body frame portion and tilted to allow the metal-processed product being dropped to slide toward the withdrawal pad, and sidewalls disposed on both sides of the body frame portion and configured to prevent the metal-processed product from being separated.

The withdrawal unit may further include first sensor portion disposed on a rear surface of the body frame portion and configured to check whether a nut is normally welded to a preset hole position of the metal-processed product and a second sensor portion disposed upward on the body frame portion and configured to detect the metal-processed product sliding on the slope rod.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a schematic diagram of a heterogeneous nut welding automation system for metal-processed products according to one embodiment;

FIG. 2 is a perspective view illustrating an automatic shuttle machine of FIG. 1;

FIG. 3 is an enlarged view illustrating part A of FIG. 2;

FIG. 4 is a schematic diagram illustrating operations of the automatic shuttle machine of FIG. 1;

FIG. 5 is a view illustrating a welding machine of FIG. 1;

FIG. 6 is a view illustrating a nut supply unit of FIG. 1;

FIG. 7 is a perspective view illustrating a withdrawal unit of FIG. 1;

FIG. 8 is a perspective view illustrating the withdrawal unit of FIG. 7 when viewed in another direction; and FIG. 9 is a schematic block diagram of the system.

DETAILED DESCRIPTION OF EXEMPLARY EMBODIMENTS

Hereinafter, in a description of embodiments of the present invention, a detailed description of a well-known technology of the related art will be omitted when it is deemed to obscure the essence of the present invention. The terms used herein are used merely for describing particular embodiments and are not intended to limit the present invention. Singular expressions, unless clearly defined otherwise in context, include plural expressions.

Throughout the application, the terms "comprise," "have," or the like are used herein to specify the presence of stated features, numbers, stages, operations, elements, components or combinations thereof but do not preclude the presence or addition of one or more other features, numbers, stages, operations, elements, components, or combinations thereof.

Hereinafter, detailed embodiments of the present invention will be described in detail with reference to the drawings.

FIG. 1 is a schematic diagram of a heterogeneous nut welding automation system for metal-processed products according to one embodiment, FIG. 2 is a perspective view illustrating an automatic shuttle machine of FIG. 1; FIG. 3 is an enlarged view illustrating part A of FIG. 2, and FIG. 4 is a schematic diagram illustrating operations of the automatic shuttle machine of FIG. 1. FIG. 5 is a view illustrating a welding machine of FIG. 1, and FIG. 6 is a view illustrating a nut supply unit of FIG. 1. FIG. 7 is a perspective view illustrating a withdrawal unit of FIG. 1, FIG. 8 is a perspective view illustrating the withdrawal unit of FIG. 7 when viewed in another direction, and FIG. 9 is a schematic block diagram of the system.

Referring to FIGS. 1 to 9, the heterogeneous nut welding automation system according to one embodiment of the present invention may include an automatic shuttle machine 1000, a welding machine 200, a nut supply unit 300, a withdrawal unit 400, a robot 500, a control unit 600, a safety fence portion 700, a server portion 800, a short-range network portion (not shown), and the like. The automation system may be introduced to a particular installation region such as a plant or the like. Since a distance between working processes may be reduced by densely arranging respective components of the system, a tack time may be improved. Meanwhile, an automation process using the system may be summarized as categories such as a loading process, a transfer process, a welding process, a test process, a withdrawal process, and the like. Also, the system may prevent industrial accidents through safety supervision of workers during the automation process.

The automatic shuttle machine 1000 includes a fixing jig part 1100 on which a plurality of metal-processed products T are arranged in a row to be spaced apart such that the metal-processed product T is loaded on one end and the metal-processed product T is unloaded on the other end and includes a transfer jig part 1200 configured to intermittently transfer the metal-processed products T arranged on the fixing jig part 1100 from one side to the other side when unloading is detected. Here, the metal-processed products T may be components for a (electric) vehicle. The metal-processed products T may be components or products on an intermediate stage, which are formed by, for example, press-working a metal plate to have a certain shape and dimension. A plurality of holes may be formed in the metal-processed product T.

The automatic shuttle machine 1000 is configured so that the metal-processed products T loaded on the one end are sequentially transferred to the other end and unloaded from the automatic shuttle machine 1000 when gripped by the robot 500. To this end, the automatic shuttle machine 1000 includes the fixing jig part 1100 and the transfer jig part 1200. Also, the automatic shuttle machine 1000 may include respective components configured to detect loading and unloading.

The fixing jig part 1100 means a fixing part without an operation such as driving and the like during a transfer process of the metal-processed products T. The fixing jig part 1100 is formed by coupling a plurality of plates or frames and has a bottom fixed to the ground. The fixing jig part 1100 includes a first perpendicular plate 1120 disposed to be perpendicular to the ground. Two first perpendicular plates 1120 may be disposed to face each other so as to support both ends of the metal-processed product T.

A plurality of fastening holes 1121 may be repetitively formed in the first perpendicular plate 1120 in the same pattern. The fastening holes 1121 may have a variety of sizes and be formed to pass through a side surface of the first perpendicular plate 1120. Also, a seat surface 1122 protruding at a certain distance to allow a part of the metal-processed product T to be mounted may be formed on the first perpendicular plate 1120. The seat surface is a flat surface and may include a shock-absorbing pad configured to prevent noise or oscillation. The seat surface 1122 may be formed to be a multistage according to a shape of the metal-processed product T.

A jig portion 1130 is coupled to a fixing frame portion 1110 at certain intervals through the fastening holes 1121 so as to hold the metal-processed product T. The jig portion 1130 holds both ends of the metal-processed product T. The jig portion 1130 may be coupled to the fixing frame portion 1110 through the fastening hole 1121. Meanwhile, a first jig portion of the jig portion 1130 which is disposed on one end and on which the metal-processed product T is initially loaded may further include a sensing portion. In detail, the first jig portion may detect whether the metal-processed product T is loaded using a current-applying sensing portion 1142 disposed using a bracket frame 1141. The bracket frame 1141 may include, for example, a body portion in which the current-applying sensing portion 1142 is inserted and accommodated and include a coupling portion extending from the body portion and configured to couple the bracket frame 1141 to the first perpendicular plate 1120. As a result, the bracket frame 1141 may be installed on one side surface of the first perpendicular plate 1120. Here, an installation method may be screw-coupling through the fastening holes 1121.

The current-applying sensing portion 1142 is inserted into the bracket frame 1141 and formed to have the same height as the seat surface 1122 so as to detect whether currents are applied. This is caused by metal properties of the metal-processed products T. The current-applying sensing portion 1142 may come into contact with the metal-processed product T through a sensing surface exposed outward from the bracket frame 1141. The current-applying sensing portion 1142 may be disposed on each first jig portion and come into contact with one end and the other end of the metal-processed product T. The current-applying sensing portion 1142 may check whether the metal-processed product T is loaded on the first jig portion normally. Meanwhile, the current-applying sensing portion 1142 may generate and transmit a normal signal with respect to whether loading is performed to the control unit 600.

On the other hand, an nth jig portion among the jig portions 1130 which is disposed on the other end and from which the metal-processed product T is unloaded may further include a sensing portion. Here, the sensing portion may be the same component as that of the current-applying sensing portion 1142 disposed on the first jig portion through the bracket frame 1141. Here, the current-applying sensing portion 1142 may detect whether the metal-processed product T is unloaded. Since the bracket frame 1141 and the current-applying sensing portion 1142 have been described above, a detailed description thereof will be omitted below. The current-applying sensing portion 1142 may check whether the metal-processed product T is unloaded from the nth jig portion normally. Meanwhile, the current-applying sensing portion 1142 may generate and transmit a normal signal to the control unit 600 about whether unloading is performed.

Also, the jig portion 1130 may further include an auxiliary frame 1131, a spacing frame 1132, a front surface holding frame 1133, a rear surface holding frame 1134, an auxiliary rear surface holding frame 1135, an outer surface holding frame 1136, a fixing pin frame (not shown), and the like. An auxiliary seat surface 1138 coupled to the side surface of the first perpendicular plate 1120 and configured to assist mounting of the metal-processed product T is formed on the auxiliary frame 1131. Here, the auxiliary seat surface 1138 may be formed to have the same height as the seat surface 1122. The auxiliary seat surface 1138 may be formed at a position spaced at a certain interval from the seat surface 1122. The spacing frame 1132 has a stapler shape with one end coupled to the side surface of the first perpendicular plate 1120. The spacing frame 1132 has a bent frame so as to allow the front surface holding frame 1133 and the auxiliary rear surface holding frame 1135 to be disposed on the first perpendicular plate 1120 while being spaced part from each other.

The front surface holding frame 1133 is coupled to the other end of the spacing frame 1132 and holds a front surface of the metal-processed product T. The rear surface holding frame 1134 is coupled to the first perpendicular plate 1120 to a side surface of one end of the spacing frame 1132 through the same fastening hole 1121 as the spacing frame 1132 and holds a rear surface of the metal-processed product T. Here, the front surface holding frame 1133 and the rear surface holding frame 1134 have the same thicknesses. Meanwhile, a distance between the front surface holding frame 1133 and the rear surface holding frame 1134 may be set to be greater than a distance between the front surface and the rear surface of the metal-processed product T.

Also, the auxiliary rear surface holding frame 1135 is coupled to the other side of the spacing frame 1132 and is disposed to face the front surface holding frame 1133. The auxiliary rear surface holding frame 1135 subsidiarily holds the rear surface of the metal-processed product T to more stably hold the metal-processed product T. The distance between the front surface holding frame 1133 and the rear surface holding frame 1134 may be set to be smaller than a distance between the front surface holding frame 1133 and the auxiliary rear surface holding frame 1135.

The outer surface holding frame 1136 is coupled to an outer surface of the first perpendicular plate 1120 and holds both ends of the metal-processed product T. The fixing pin frame is coupled to the side surface of the first perpendicular plate 1120 and restricts a position of the metal-processed product T held thereon. The fixing pin frame may fix the position of the metal-processed product T using a method of inserting a fixing pin, which is disposed to protrude, into a position restriction hole formed in the metal-processed product T.

The transfer jig part 1200 intermittently transfers each metal-processed product T disposed on the fixing jig parts 1100 from one side to the other side at the same time when unloading is detected. In detail, the transfer jig part 1200 may include a transfer frame portion 1210, a transfer jig unit 1220, a lift portion 1230, and a horizontal movement portion 1240. The transfer frame portion 1210 is formed by coupling a plurality of frames and is transferred in upward, downward, leftward, and rightward directions. The transfer jig unit 1220 is coupled to the transfer frame portion 1210 and disposed inside the fixing jig part 1100 to hold the metal-processed product T being transferred.

In detail, the transfer jig unit 1220 may include a fixing bracket portion 1221, a second perpendicular plate 1222, a transfer jig portion 1223, and the like. The fixing bracket portion 1221 is coupled to the transfer frame portion 1210. The second perpendicular plate 1222 is coupled to the fixing bracket portion 1221. A plurality of fastening holes may be repetitively formed in the second perpendicular plate 1222 in the same pattern. A transfer seat surface 1224 protruding at a certain distance to allow a part of the metal-processed product T being transferred to be mounted may be formed on the second perpendicular plate 1222. The transfer jig portions 1223 are coupled to the second perpendicular plate 1222 at a certain interval and temporarily hold the metal-processed product T being transferred.

The lift portion 1230 is coupled to the transfer frame portion 1210 and provides the transfer jig unit 1220 with upward and downward vertical movement through a first driving portion. The horizontal movement portion 1240 is coupled to the transfer frame portion 1210 and provides the transfer jig unit 1220 with front-rear horizontal movement through a second driving portion. Since the first driving portion and the second driving portion each include well-known driving elements such as a motor, a driving cylinder, a decelerator, and the like, a detailed description thereof will be omitted.

In the transfer jig part 1200, when unloading is sensed, 1) the transfer jig unit 1220 is moved upward by the lift portion 1230 and lifts the metal-processed product T disposed on the fixing jig part 1100, 2) when the transfer jig unit 1220 is moved by the horizontal movement portion 1240 a preset distance from one side to the other side, and 3) the transfer jig unit 1220 is moved downward by the lift portion 1230 and the metal-processed product T held by the transfer jig unit 1220 is placed on the fixing jig part 1100 next thereto. Here, the transfer jig unit 1220 is released from a contact state with the metal-processed product T and is located below the metal-processed product T so that interference does not occur therebetween. Subsequently, the transfer jig unit 1220 is moved by the horizontal movement portion 1240 in a direction from the other side to the one side and returns to an original position.

The welding machine 200 is a device configured to automatically weld a fastening member such as a nut or the like to the metal-processed product T. The welding machine 200 welds heterogeneous nuts to the plurality of holes formed in the metal-processed product T. Two types of nuts may be welded to the holes according to one embodiment. As described above, since the nuts are welded to the metal-processed product T, the metal-processed product T may be fixed to a body or the like of a vehicle or be coupled to another component. For example, the welding machine 200 may be a device configured to perform electrical resistance welding. The welding machine 200 may perform an optimal welding process by uniformly controlling currents and pressure according to a type of nut. Accordingly, the welding machine 200 may provide torque performance requested by each nut according to the type of nut.

The welding machine 200 according to one embodiment may include two or more welding units 210 disposed to be spaced apart to perform welding with respect to heterogeneous nuts (for example, M6, M8, and the like). The welding unit 210 may include a lower electrode portion 212 and an upper electrode portion 211 which is vertically movable. Here, a bottom surface of the metal-processed product T is supported by the lower electrode portion 212. Here, a nut is mounted on a top surface of the metal-processed product T through a nut mounting device 213. Then, the upper electrode portion 211 is moved downward and performs welding at a place where the nut comes into contact with the metal-processed product T.

The respective welding units 210 may be controlled to provide different currents and pressures. That is, different welding units 210 are used according to types of nuts. In the welding machine 200 according to one embodiment, two welding units 210 are disposed. Meanwhile, the welding units 210 may measure signals related to the currents and pressures during a welding process and may transfer the signals to the control unit 600. The control unit 600 may primarily count a total quantity of nuts welded to one metal-processed product T, that is, the number of beating points.

Meanwhile, one nut supply unit 300 configured to supply only a single type of nut is connected to the welding unit 210 one by one. As a result, the nut supply unit 300 may supply heterogeneous nuts to the welding machine 200. The nut supply unit 300 guides the nuts to be introduced into an inner circumferential surface of a hopper 310 due to a centrifugal force and to be discharged in a row. Here, the nut supply unit 300 generates oscillation and enables smoother movement of the nuts. The hopper 310 has a shape with an open top and is a part into which the nut is inserted to be stored. In the nut supply unit 300, a nut guide portion 320 is connected to an end of one side of the hopper 310. The nut may stand by on the nut guide portion 320 while a welding process is performed by the welding machine 200. Also, a transfer nozzle 330 is connected to an end of the nut guide portion 320. The nut is transferred from the nut guide portion 320 to the welding machine 200 (particularly, to a nut mounting device 213) through the transfer nozzle 330. The transfer nozzle 330 has a hollow hose shape.

The withdrawal unit 400 checks whether the number of nuts welded to the metal-processed product T is normal and then moves the metal-processed product T to a withdrawal pad 440. The withdrawal unit 400 may sense the nut at a particular position of the metal-processed product T using a plurality of proximity sensors. In detail, the withdrawal unit 400 may include a body frame portion 410, a slope rod 420, a sidewall 430, a first sensor portion 450, a second sensor portion 460, and the like.

The body frame portion 410 is formed by coupling a plurality of pieces of angle iron arranged in vertical, horizontal, and tilted directions. The body frame portion 410 is fixedly installed on the ground. The slope road 420 is disposed above the body frame portion 410 to be tilted such that the metal-processed product T, which is being lowered down, slides toward the withdrawal pad 440. For example, a pair of such slope rods 420 may be disposed to be spaced apart from each other and face each other. Meanwhile, such sidewalls 430 are disposed on both sides of the body frame portion 410 and prevent the metal-processed product T from being separated.

The withdrawal pad 440 is installed on the body frame portion 410. The withdrawal pad 440 is a part where the metal-processed product T which has been completely tested is withdrawn from the withdrawal unit 400. The withdrawal pad 440 may have an elastic material and absorb a shock applied to the metal-processed product T which is sliding.

The first sensor portion 450 is disposed behind the body frame portion 410 and checks whether the nut is normally welded to a preset hole position of the metal-processed product T. The first sensor portion 450 may include a plurality of proximity sensors. Here, one proximity sensor may be used for each nut. That is, the number of such proximity sensors is equal to a total number of nuts welded to the metal-processed product T. The proximity sensor may sense when the nut is located within a certain distance. The proximity sensors are disposed on the body frame portion 410 in consideration of locations of the nuts welded to the metal-processed product T.

The first sensor portion 450 may measure the number of the nuts actually welded to the metal-processed product T and then transmit the number to the control unit 600. Accordingly, the system may double check using a method of comparing the number of beating points with the number of nuts actually welded to the metal-processed product T.

The second sensor portion 460 is disposed upward on the body frame portion 410 and detects the metal-processed product T which is sliding on the slope rod 420. The second sensor portion 460 may count the number of the metal-processed products T on which the welding process is completely performed. Meanwhile, the second sensor portion 460 may double check using a method of comparing the number of metal-processed products T which are measured using the welding machine 200 with the number of metal-processed products T which are actually withdrawn through the withdrawal unit 400.

The robot 500 translocates the metal-processed product T a plurality of times so that the metal-processed product T is gripped by the automatic shuttle machine 1000 and then moved to the welding machine 200 to weld the nuts thereto and the robot 500 drops the metal-processed product T toward the withdrawal unit 400. The robot 500 may be driven according to the control unit 600 and a preset algorithm. In the robot 500, a plurality of link portions are connected and pivot multiaxially. In the robot 500, a driving motor is used for each spindle so that a degree of freedom in operation may be improved through multiaxial pivoting. The robot 500 may freely translocate the metal-processed product T in a three-dimensional space using a bending ability, a direction-changing ability, and the like due to joint portions.

The robot 500 may grip the metal-processed product T using a grip portion formed on an arm end portion. The robot 500 translocates the metal-processed product T so as to precisely locate the holes of the metal-processed product T in the lower electrode portion 212. When one nut is completely welded, the robot 500 translocates the metal-processed product T to perform a welding process on the next nut. When any one type of nut is completely welded by the welding unit 210 on one side, the robot 500 according to one embodiment moves toward the welding unit 210 on the other side and welds another type of nut.

The control unit 600 processes electrical signals transmitted from the automatic shuttle machine 1000, the welding machine 200, the nut supply unit 300, the withdrawal unit 400, and the robot 500 and generates a control signal. Meanwhile, the control unit 600 may transmit a control signal to each component of the system so as to separately control the component. The control unit 600 may be included in the server portion 800. Meanwhile, the server portion 800 may further include a database, a wireless transmission/reception portion, and the like.

For example, the control unit 600 may receive an electrical signal measured by the first sensor portion 450 and may generate a control signal corresponding thereto. Also, the control unit 600 may integrally control the system by processing data transmitted from each component. As a result, when a failure, an accident, and other errors occur at any one part of components, the system may stop operations overall. For example, when the number of nuts which is measured by the first sensor portion 450 does not coincide with the number of beating points in the withdrawal unit 400, the system may temporarily stop. Also, the respective components of the system are electrically connected to one another.

The short-range network portion also transmits electrical signals and data between a smart phone of a worker and a smart phone of a supervisor in addition among the respective components included in the system. Meanwhile, an exclusive application may be installed in each of the smart phone of the worker and the smart phone of the supervisor. Accordingly, for example, the server portion 800 may perform Bluetooth-based wireless communication with the smart phone of the worker and the smart phone of the supervisor through the wireless transmission/reception portion. When the exclusive application is executed, worker information, a work schedule, a work state, organization of work shift, safety regulations information, and the like may be seen. Based on position information, when a worker is located near the particular installation region of the system, a position of the worker may be automatically recognized. Meanwhile, when a workload assigned to a worker according to the work schedule is completely done, the worker may transmit a message related to end-of-work according to confirmation of the supervisor.

Also, the safety fence portion 700 is formed to surround an installation region in which the system is disposed. The safety fence portion 700 includes a safety door to allow the worker to enter or exit from the installation region. Meanwhile, a third sensor portion 710 configured to sensor whether the safety door is locked or not is installed on the safety door and may transmit a measurement signal to the control unit 600. For example, when the safety door is opened, the system may be temporarily stopped by the control unit 600.

According to the embodiments of the present invention, a variety of effects including the following effects may be provided. However, the present invention is not limited to the following effects.

According to one embodiment of the present invention, a heterogeneous nut welding automation system for a metal-processed product may introduce a variety of elements and techniques optimized for automation into a process of welding different nuts several times to a metal-processed product for a vehicle which has a complicated shape.

Also, reliability in quality may be secured by uniformly providing a current and a pressure which are significant factors of welding for each nut in a welding process. Also, omission of a nut or welding of a wrong type of nut may be prevented. Accordingly, an error rate with respect to products may be reduced. Also, reliability in administration of the welding process may be secured and overall productivity may be improved. Also, a benefit in management may be improved by reducing product costs. Also, occurrence of negligent accidents caused by a mistake of a worker or the like may be reduced by minimizing commitment of workers.

Although the exemplary embodiment of the present invention has been described above, the scope of the present invention is not limited to the above particularly embodiment and may be adequately changeable within the scope disclosed in the claims.

What is claimed is:

1. A heterogeneous nut welding automation system for a metal-processed product, the system comprising:
an automatic shuttle machine comprising a fixing jig part on which a plurality of metal-processed products are arranged in a row to be spaced apart such that the metal-processed product is loaded on one end and the metal-processed product is unloaded on the other end and comprising a transfer jig part configured to intermittently transfer the metal-processed products arranged on the fixing jig part from one side to the other side when unloading is detected by a current-applying sensing portion;
a welding machine configured to weld heterogeneous nuts to the metal-processed product;
a nut supply unit configured to supply the heterogeneous nuts to the welding machine and comprising a nut guide connected to an end of one side of a hopper and a transfer nozzle connected to an end of the nut guide portion;
a withdrawal unit configured to sense the nut at a particular position of the metal-processed product using a plurality of proximity sensors and then move the metal-processed product to a withdrawal pad;
a robot configured to grip and move the metal-processed product from the automatic shuttle machine to the welding machine, translocate the metal-processed-product to allow the nuts to be welded thereto, and drop the metal-processed product to the withdrawal unit; and
a control unit configured to process electrical signals transmitted from the automatic shuttle machine, the welding machine, the nut supply unit, the withdrawal unit, and the robot and generate a plurality of control signals, and
the fixing jig part comprises:
a fixing frame portion in which a plurality of fastening holes are repetitively formed in the same pattern and which comprises a first perpendicular plate on which a seat surface protruding at a certain distance to allow a part of the metal-processed product to be mounted thereon is formed; and
a jig portion coupled to the fixing frame portion at a certain interval through the fastening holes so as to hold the metal-processed product,
a first jig portion of the jig portion which is disposed on one end and on which the metal-processed product is initially loaded comprises:
a bracket frame installed on one side surface of the first perpendicular plate; and
the current-applying sensing portion inserted into the bracket frame and formed to have the same height as the seat surface so as to detect whether currents are applied and whether the metal-processed product is unloaded,
the jig portion comprises:
an auxiliary frame coupled to a side surface of the first perpendicular plate and on which an auxiliary seat surface configured to assist mounting of the metal-processed product is formed to have the same height as the seat surface;
a spacing frame configured to have a stapler shape and have one end coupled to the side surface of the first perpendicular plate;
a front surface holding frame coupled to the other end of the spacing frame and configured to hold a front surface of the metal-processed product;
a rear surface holding frame coupled to the first perpendicular plate through some holes as the spacing frame in on a side surface of the spacing frame and configured to hold a rear surface of the metal-processed product; and
an auxiliary rear surface holding frame coupled to the spacing frame, disposed to face the front surface holding frame and configured to subsidiarily hold the rear surface of the metal-processed product;
the withdrawal unit comprises:
a body frame portion formed by coupling a plurality of pieces of angle iron disposed in vertical, horizontal, and tilted directions;
a slope rod disposed above the body frame portion and tilted to allow the metal-processed product being dropped to slide toward the withdrawal pad; and
sidewalls disposed on both sides of the body frame portion and configured to prevent the metal-processed product from being separated.

2. The system of claim 1, wherein the welding machine comprises two or more welding units disposed to be spaced apart, and
wherein the welding units are controlled to provide mutually different currents and pressures, and one nut supply unit configured to supply only one type of nuts is connected to each of the welding units.

3. The system of claim 1, wherein the transfer jig part comprises:
a transfer frame portion;
a transfer jig unit coupled to the transfer frame portion and disposed inside the fixing jig part so as to hold the metal-processed product being transferred;
a lift portion configured to provide the transfer frame portion with upward and downward vertical movement; and
a horizontal movement portion configured to provide the transfer frame portion with front-rear horizontal movement.

4. The system of claim 3, wherein the transfer jig unit comprises:
a fixing bracket portion coupled to the transfer frame portion;
a second perpendicular plate coupled to the fixing bracket portion and on which a transfer seat surface protruding at a certain distance to allow a part of the metal-processed product being transferred to be mounted thereon is formed; and
a transfer jig portion coupled to the second perpendicular plate at a certain interval and configured to temporarily hold the metal-processed product being transferred.

5. The system of claim 4, wherein in the transfer jig part, when unloading is sensed by the current-applying sensing portion, 1) the transfer jig unit is moved upward by the lift portion and lifts the metal-processed product disposed on the fixing jig part, 2) when the transfer jig unit is moved by the horizontal movement portion a preset distance from one side toward the other side, and 3) the transfer jig unit is moved downward by the lift portion and the metal-processed product held by the transfer jig unit is disposed on a next fixing jig part.

6. The system of claim 1, wherein the withdrawal unit further comprises:
- a first sensor portion disposed on a rear surface of the body frame portion and configured to check whether a nut is normally welded to a preset hole position of the metal-processed product; and
- a second sensor portion disposed upward on the body frame portion and configured to detect the metal-processed product sliding on the slope rod.

\* \* \* \* \*